(12) United States Patent
Broch et al.

(10) Patent No.: US 8,540,323 B2
(45) Date of Patent: Sep. 24, 2013

(54) ELECTRONICALLY CONTROLLED BRAKING DEVICE OF A TOWING VEHICLE-TRAILER COMBINATION

(75) Inventors: Walter Broch, Asperg (DE); Frank Werner, Ditzingen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 426 days.

(21) Appl. No.: 12/448,832

(22) PCT Filed: Jan. 11, 2008

(86) PCT No.: PCT/EP2008/050284
§ 371 (c)(1),
(2), (4) Date: Sep. 29, 2009

(87) PCT Pub. No.: WO2008/084092
PCT Pub. Date: Jul. 17, 2008

(65) Prior Publication Data
US 2010/0019565 A1    Jan. 28, 2010

(30) Foreign Application Priority Data

Jan. 12, 2007 (DE) .......................... 10 2007 001 872
May 4, 2007 (DE) .......................... 10 2007 020 881

(51) Int. Cl.
*B60T 8/32* (2006.01)
(52) U.S. Cl.
USPC .......................................... 303/7; 188/112 R
(58) Field of Classification Search
USPC ................ 303/3, 7, 128; 188/112 R
See application file for complete search history.

(56) References Cited

U.S. PATENT DOCUMENTS

| | | | |
|---|---|---|---|
| 5,255,962 A | | 10/1993 | Neuhaus et al. |
| 5,588,716 A | * | 12/1996 | Stumpe ............................ 303/7 |

(Continued)

FOREIGN PATENT DOCUMENTS

| | | |
|---|---|---|
| DE | 40 22 671 | 7/1990 |
| DE | 42 27 084 | 2/1994 |

(Continued)

OTHER PUBLICATIONS

Technical Information of the Robert Bosch GmbH, "Druckluftanlagen fur Nutzfahrzeuge, Grundlagen, Systeme under Plaene" ["Compressed Air Systems for Commercial Vehicles, Principles, Systems and Plans"].

(Continued)

*Primary Examiner* — Christopher Schwartz
(74) *Attorney, Agent, or Firm* — Kenyon & Kenyon LLP

(57) ABSTRACT

An electronically controlled braking device of a towing vehicle-trailer combination, which includes at least a generating arrangement (FBM) for generating at least one brake request signal, an electronic towing vehicle brake control unit associated with the towing vehicle for generating brake pressure setpoint value signals for at least one electro-pneumatic pressure control module of the towing vehicle as a function of the brake request signal, a data link between the towing vehicle and the trailer, at least one electro-pneumatic pressure control module associated with the trailer for controlling a trailer brake pressure, in which the data link is for direct communication between the towing vehicle brake control unit and the at least one electro-pneumatic pressure control module of the trailer, and in which the towing vehicle brake control unit and the data link are for directly inputting control signals into the at least one pressure control module of the trailer for generating the trailer brake pressure at least as a function of the brake request signal.

12 Claims, 3 Drawing Sheets

(56) References Cited

U.S. PATENT DOCUMENTS

| | | | |
|---|---|---|---|
| 5,986,544 A * | 11/1999 | Kaisers et al. | 340/431 |
| 6,447,075 B2 * | 9/2002 | Ross et al. | 303/20 |
| 6,970,772 B2 | 11/2005 | Radtke et al. | |
| 7,309,111 B2 * | 12/2007 | Herges et al. | 303/7 |
| 7,520,572 B2 * | 4/2009 | Hatipoglu et al. | 303/3 |
| 2005/0179314 A1 | 8/2005 | Csak et al. | |
| 2006/0131950 A1 * | 6/2006 | Larson | 303/7 |

FOREIGN PATENT DOCUMENTS

| | | |
|---|---|---|
| DE | 102 16 564 | 4/2002 |
| DE | 103 38 571 | 8/2003 |
| DE | 102 26 623 | 12/2003 |
| DE | 103 10 235 | 9/2004 |
| EP | 0 532 863 | 3/1993 |
| EP | 0 941 905 | 9/1999 |
| EP | 1 359 076 | 11/2003 |
| EP | 1 541 437 | 6/2005 |
| GB | 1 599 086 | 9/1981 |

OTHER PUBLICATIONS

"Das Bremssystem Ebs Von Scania Scania Ebs Brake System" Atz Automobiltechnische Zeitschrift, Vieweg Publishing, Wiesbaden, DE, vol. 98, No. 9, Sep. 1996, pp. 406-407, XP000627474, ISSN: 001-2785, p. 406.

Kraftfahr-technisches Taschenbuch of Robert Bosch GmbH, vol. 26, p. 909.

European Patent Office, International Preliminary Report on Patentability, Jul. 14, 2009, from International Patent Application No. PCT/EP2008/050284, filed on Jan. 11, 2008.

European Patent Office, Translation of International Preliminary Report on Patentability, Aug. 4, 2009, from International Patent Application No. PCT/EP2008/050284, filed on Jan. 11, 2008.

* cited by examiner

ELECTRONICALLY CONTROLLED BRAKING DEVICE OF A TOWING VEHICLE-TRAILER COMBINATION

This application is a 371 of PCT/EP2008/050284 filed on Jan. 11, 2008.

FIELD OF THE INVENTION

The present invention is based on an electronically controlled braking device of a towing vehicle-trailer combination.

BACKGROUND INFORMATION

A towing vehicle-trailer combination may include a generating arrangement (FBM) for generating at least one brake request signal, an electronic towing vehicle brake control unit associated with the towing vehicle for generating brake pressure setpoint value signals for at least one electro-pneumatic pressure control module of the towing vehicle as a function of the brake request signal, a coupleable data link between the towing vehicle and the trailer, and at least one electro-pneumatic pressure control module associated with the trailer for controlling a trailer brake pressure.

Such an electronically controlled brake system is discussed for example in the Technical Information of the Robert Bosch GmbH "Druckluftanlagen für Nutzfahrzeuge, Grundlagen, Systeme und Pläne" ["Compressed Air Systems for Commercial Vehicles, Principles, Systems and Plans"]. In an electronically controlled brake system, normally a purely pneumatic subordinate brake circuit has superimposed on it an electronic overriding control circuit, which suppresses the pneumatic control system, which forms a backup brake circuit in the event that the electrical or electronic brake circuit fails.

Depending on the option, the brake pressure is controlled by axle or by wheel. Systems having an electronic stability program (ESP) require a wheel-specific pressure detection. In the electrical brake system, an error detection triggers a selective shutdown of the affected functions or components.

The braking value sensor is normally made up of a foot brake module, in which two redundant sensors detect the driver's braking command. They transmit the measured value to the central towing vehicle brake control unit, which from this calculates brake pressure setpoint values as electrical signals. These electrical signals are input into a data bus, the brake CAN. On the other hand, in a manner analogous to a conventional foot brake valve, one to two pneumatic control pressures are controlled in accordance with the pedal activation on the part of the driver.

The pressure control modules form the interface between the electronic brake system and the pneumatic braking force. They convert the brake pressure setpoint values transmitted via the data bus into pneumatic pressures. The conversion is performed using proportional solenoid valves or an inlet-outlet solenoid valve combination. An integrated pressure sensor measures the controlled brake pressure in order to implement a brake pressure control in a closed brake circuit. An electrically activated backup solenoid valve blocks the pneumatic control pressures of the foot brake module so as to allow for a non-influenced electronic pressure control.

The pneumatic control pressure to the trailer is likewise controlled electronically via a trailer control module. The electronic trailer control module allows for the pneumatic trailer control pressure to be controlled in accordance with the electrical setpoint value signals of the towing vehicle brake control unit and is constructed in a similar manner as a pressure control module. At the output of the trailer control module there are pneumatic coupling heads for brake pressure and control pressure that are coupleable with complementary coupling heads on the trailer side and are there fed to a trailer brake valve, which forms from this the pneumatic control pressure for the pressure control modules of the trailer in the event of a backup.

In addition to combinations of towing vehicles equipped with electronic brake systems (ELBS) and trailer vehicles that are likewise equipped with such an electronic brake system, it must also be possible to couple such trailers to the towing vehicle as are equipped merely with a purely pneumatic brake system. For this reason, the output pressure generated by the trailer control module is not only used as backup pressure for a trailer having an electronic brake system (ELBS), but rather also as control pressure for the purely pneumatically acting brake system of a conventional trailer. Conventional as well as electrically braked trailers normally have an antilock braking system (ABS) and/or an automatic load-dependent braking force distribution (ALB), in which the braking forces are adapted to the currently prevailing axle loads. Additionally, an electronic stability program (ESP) may be implemented in the control unit of the trailer and/or in the control unit of the towing vehicle such that there exists a relatively high number of variants.

The interplay between the towing vehicle and the trailer is regulated by legislation with the aid of a compatibility diagram. But even within the legal limits, the interaction of certain vehicle combinations may result for example in an unevenly distributed wear between the brakes of the towing vehicle and those of the trailer or may result in the vehicle combination jackknifing during a braking operation. For this reason, in known electronic brake systems (ELBS), the coupling force of semitrailer trains is adjusted to the vertical load borne by the semitrailer tractor and in truck-trailer combinations is adjusted to zero (coupling force control). If the wheel speed from the trailer vehicle is available, then it is possible to balance the braking forces additionally by considering the differential slip between the towing vehicle and the trailer (differential slip control).

In known trailers that are equipped with an electronic braking system, the electrical signals for the brake pressure setpoint values controlled by the towing vehicle brake control unit are transmitted via the trailer CAN to an electronic trailer brake control unit. The brake pressure setpoint values generated by the towing vehicle brake control unit are then corrected or adapted already in the towing vehicle brake control unit and/or in the trailer brake control unit according to one or several of the above-mentioned control systems and are input as electrical brake pressure setpoint value signals into the pressure control modules of the trailer. For this purpose, characteristic curves are stored in a control unit memory which describe the dependence of the input brake pressure setpoint values on trailer-specific boundary conditions and on the control specifications. These characteristic curves are ascertained in tests and are specified at the factory by the trailer manufacturer.

The problem with this, however, is that the communication of the individual systems in the towing vehicle on the one hand and in the trailer vehicle on the other hand is normally limited, which makes the adaptation to different conditions of use and boundary conditions more difficult such that the above-mentioned control functions are sometimes carried out only inadequately. On the other hand, the compatibility requirements between the towing vehicle and the trailer, which postulate for example a compatibility of an electronically braked towing vehicle with a purely conventionally pneumatically braked trailer, severely limit the functionality of the braking device.

SUMMARY OF THE INVENTION

The exemplary embodiments and/or exemplary methods of the present invention is based on the objective of further developing an electronically controlled braking device of a towing vehicle-trailer combination in such a way that it is more simply constructed on the one hand, while allowing for an improved communication between the towing vehicle and the trailer vehicle and an increased functionality.

According to the exemplary embodiments and/or exemplary methods of the present invention, this objective may be achieved by the features described herein.

As further features, the exemplary embodiments and/or exemplary methods of the present invention provides for the data link to be developed for direct communication between the towing vehicle brake control unit and the at least one electro-pneumatic pressure control module of the trailer and for the towing vehicle brake control unit and the data link for directly inputting control signals into the at least one pressure control module of the trailer to be developed for generating the trailer brake pressure at least as a function of the brake request signal.

This means, in other words, that the axles of the trailer are treated in terms of brake technology as additional axles of the towing vehicle. This is objectively implemented by the fact that on the side of the towing vehicle the trailer control module known from the related art and on the side of the trailer the electronic trailer brake control unit are omitted and that the pressure control modules of the trailer now have the electrical and/or pneumatic control signals of the towing vehicle applied to them directly, i.e. without additional influence or interconnection of components influencing control signals.

This brings with it on the one hand the advantage of a greatly simplified construction of the braking device since together with the two omitted, above-mentioned components a series of wiring and tubing is omitted as well.

On the other hand, all control functions such as for example the stability, differential slip, wear, coupling force control and/or the load-dependent braking force distribution may be merged in one or multiple control unit(s) associated with the towing vehicle, in particular the towing vehicle brake control unit.

This allows for example for slip-controlled braking of all axles of the towing vehicle-trailer combination, which could have a wear control superimposed on it. This results in every axle, in particular also the axles of the trailer, being braked in accordance with its respective load.

In an exemplary embodiment, the towing vehicle brake control unit and the data link for directly inputting control signals into the at least one pressure control module of the trailer are therefore developed to generate the trailer brake pressure also in dependence on regulating or control functions such as a differential slip control and/or an antilock braking control (ABS) and/or an electronic stability control (ESP) and/or a wear control and/or a load-dependent braking force distribution (ALB).

Advantageous developments and improvements of the invention described herein are rendered possible by the measures further specified herein.

The at least one brake request signal may be generated by a braking value sensor as a function of a driver command. Alternatively or additionally, other systems may request the brake request signal, i.e. a deceleration or a brake pressure, via the electronic brake control unit.

If the braking value sensor generates at least one pneumatic and at least one electrical brake request signal, which is customary in an electronic braking force control system having a pneumatic backup brake circuit, then the at least one pneumatic brake request signal of the braking value sensor may be input via at least one coupleable pneumatic line analogously to the electrical brake request signal likewise directly into the at least one pressure control module of the trailer. The pressure control modules of the trailer then have the pneumatic control signals of the towing vehicle applied to them directly, i.e. without being additionally influenced or having components influencing the control signals interposed. Furthermore, a coupleable brake pressure line is provided between the towing vehicle and the trailer, which supplies the trailer and in particular its pressure control modules with a brake pressure from a pressure generator of the towing vehicle.

In order to provide suitable countermeasures in the event of a rupture of one or both pneumatic lines (control pressure line, brake pressure line) such as for example an automatic braking operation at least of the trailer by an emergency braking device, a device for monitoring the pressure in the coupleable pneumatic lines may be provided which monitors for example the pressures prevailing there on the basis of a plausibility test.

Further details emerge from the following description of exemplary embodiments.

Below, exemplary embodiments of the present invention are represented in the drawing and are explained in detail in the subsequent description.

DETAILED DESCRIPTION

Figure 1:
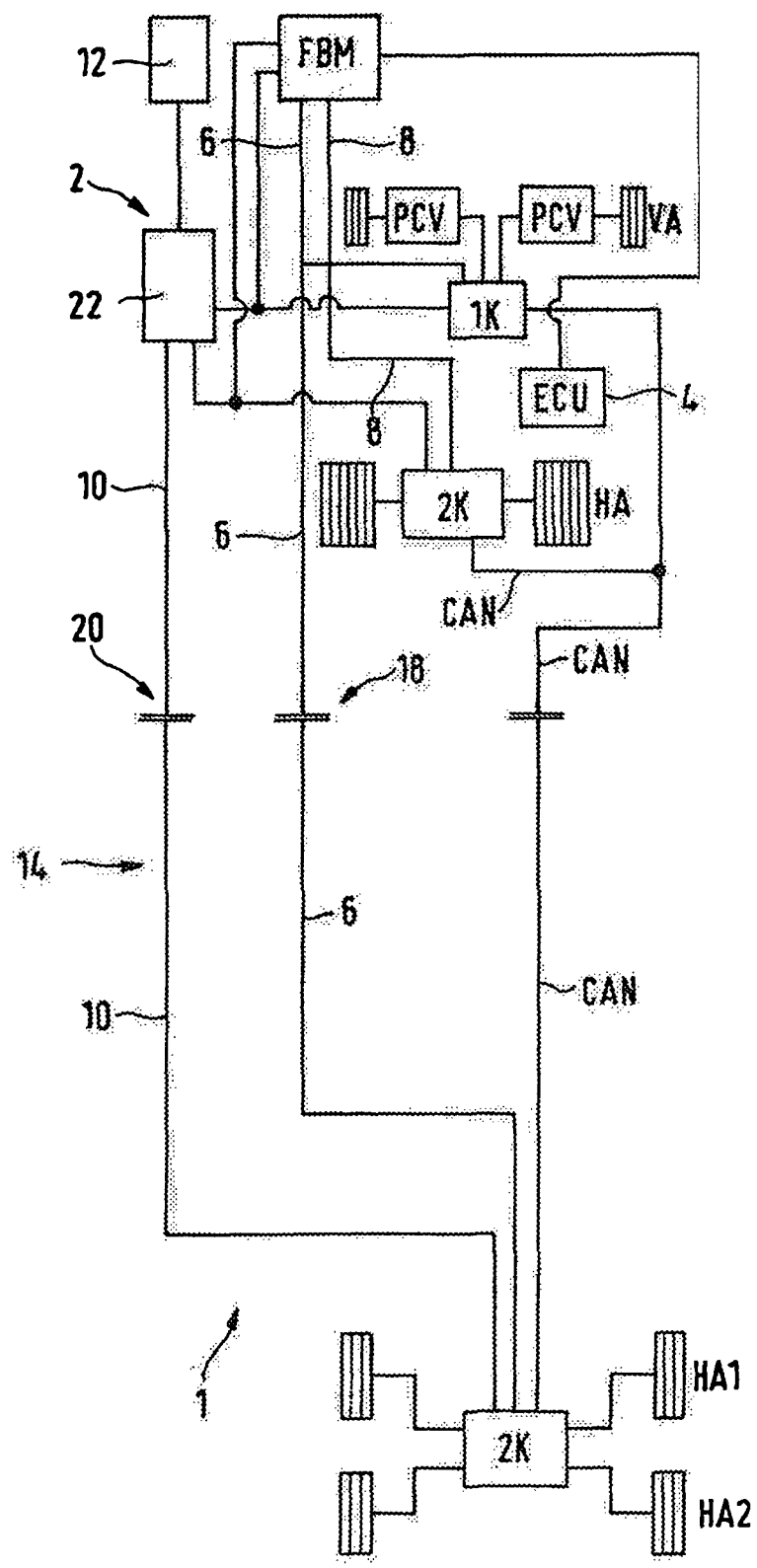
FIG. 1 shows a schematic representation of the structure of an electronically controlled braking device of a towing vehicle-trailer combination according to an exemplary embodiment of the present invention.

With reference numeral 1, FIG. 1 shows an exemplary embodiment of an electronically controlled braking device of a towing vehicle-trailer combination, for example in the form of a tractor 2 with semitrailer 14.

Braking device 1 includes a braking value sensor in the form of a foot brake module FBM, in which sensors, which may be redundant, detect the driver's brake command, i.e. an activation angle of a foot brake pedal, and which as a function of the latter forms, in a pneumatic segment within a front axle channel, a pneumatic brake request signal associated with a front axle VA of towing vehicle 2 and, within a rear axle channel, forms a pneumatic brake request signal associated with a rear axle HA of towing vehicle 2, and forms an electrical brake request signal in an electrical segment.

Via a signal line, in particular via a data bus and more precisely via a brake CAN (controller area network), or in an analog manner, the electrical brake request signal is supplied to an electronic towing vehicle brake control unit 4, which calculates from this an electrical brake pressure setpoint value signal for downstream pressure control modules that are electrically connected to towing vehicle brake control unit 4 likewise via the brake CAN. The towing vehicle-trailer combination may be equipped with an antilock brake system (ABS).

The two pneumatic brake request signals are generated by foot brake module FBM already as control pressures and are supplied directly to pressure control modules 1K, 2K of towing vehicle 2 via two pneumatic control pressure lines 6, 8. For front axle VA, these are made up of for example a 1-channel pressure control module 1K, which is followed downstream by respectively one pressure control valve PCV for the right side and for the left side in order to be able to adjust wheel-specific brake pressures by pressure buildup, pressure reduction and pressure maintenance. By contrast, the rear axle HA may be equipped with twin tires is provided with a 2-channel pressure control module 2K for example such that no pressure control valves are required for wheel-specific pressure control.

In parallel to control pressure lines 6, 8, a brake pressure line 10 is run from a compressed air reservoir 12 associated with the towing vehicle to pressure control modules 1K, 2K of front axle VA and rear axle HA of the towing vehicle in order to supply these with brake pressure. A four-circuit protective valve 22 is interposed between pressure control modules 1K, 2K of towing vehicle 2 and between pressure control module 2K of semitrailer 14 and compressed air reservoir 12.

Generated in a pneumatic control circuit of the towing vehicle-trailer combination including compressed air reservoir 12, the pneumatic segment of foot brake module FBM, pneumatic control pressure lines 6, 8, four-circuit protective valve 22 and brake pressure line 10, the pneumatic control pressures are effective in pressure control modules 1K, 2K, 2K for generating brake pressures only when there is an error in an electrical control circuit that includes towing vehicle brake control unit 4, the CAN databus and the electrical segment of foot brake module FBM.

Pressure control modules 1K, 2K, 2K convert the electrical brake pressure setpoint values transmitted via the CAN data bus, and, in the event of a backup, also the pneumatic brake pressure setpoint values, into pneumatic brake pressures for the pneumatic brake cylinders (not shown here for reasons of scale) situated downstream of pressure control modules 1K, 2K, 2K. The conversion is performed using proportional solenoid valves or an inlet-outlet solenoid valve combination. A pressure sensor integrated in pressure control module 1K, 2K, 2K measures the controlled brake pressure in order to implement a brake pressure control in a closed brake circuit.

An electrically activated backup solenoid valve blocks the pneumatic control pressures of foot brake module FBM so as to allow for a non-influenced electronic pressure control. The structure of such a pressure control module 1K, 2K, 2K is sufficiently known and shall therefore not be explained here in more detail. Trailer 14 in the form of a semitrailer includes for example a 2-channel pressure control module 2K for controlling the brake pressure on its two rear axles, a first rear axle HA1 and a second rear axle HA2. 2-channel pressure control module 2K is able to control the pressure for rear axle HA of towing vehicle 2 in a side-specific manner. By contrast, front axle VA of towing vehicle 2 has a 1-channel pressure control module 1K assigned to it, different pressures in the brake cylinders of the right and the left side being adjusted by pressure control valves PCV.

For a direct transmission of the electrical brake pressure setpoint value signal, controlled by towing vehicle brake control unit 4, to 2-channel pressure control module 2K of semitrailer 14, the CAN data bus is extended up to a plug-in coupling 16, for example in accordance with ISO 76 38 and from there is fed through directly into 2-channel pressure control module 2K of trailer 14. Such a direct feed-through or connection is to be understood as a transmission without additionally influencing, changing or adapting the electrical brake pressure setpoint value signal controlled by towing vehicle brake control unit 4.

Furthermore, pneumatic control pressure line 6 is also fed through from foot brake module FBM to 2-channel pressure control module 2K of trailer 14, which supplies for example 1-channel pressure control module 1K of front axle VA of towing vehicle 2 with control pressure. For this purpose, this control pressure line 6 is run in towing vehicle 2 up to a towing vehicle-side coupling head of a pneumatic coupling "control pressure" 18 so as then to feed it onward via a trailer-side "control pressure" coupling head up into 2-channel pressure control module 2K of trailer 14. The pneumatic control pressure signal controlled by foot brake module FBM which may be for the front axle channel of towing vehicle 2 is thereby also input directly, i.e. without being influenced or changed, into the trailer's 2-channel pressure control module 2K. The same applies to brake pressure line 10, which feeds brake pressure via a pneumatic coupling "brake pressure" 20 from compressed air reservoir 12 of towing vehicle 2 into 2-channel pressure control module 2K of trailer 14.

All of the control and regulating functions relating to braking device 1 of the towing vehicle-trailer combination such as for example a stability control (ESP) and/or a differential slip control and/or a wear control and/or a coupling force control and/or a load-dependent braking force distribution (ALB) are combined in towing vehicle brake control unit 4 or are implemented there, the mentioned list not being final. This means that all control and regulating functions relating to the 2-channel pressure control module 2K or the brake pressures of trailer 14 are also administered by a control unit situated in towing vehicle 2, which may be by towing vehicle brake control unit 4. Alternatively, towing vehicle 2 may also include multiple control units for the mentioned purposes. What is crucial is only the fact that these are associated with towing vehicle 2 and are situated in it.

Towing vehicle brake control unit 4 is developed to detect a coupling of the data link, i.e. of plug-in coupling 16 between towing vehicle 2 and trailer 14, and transmits the electrical control signals to pressure control module 2K of trailer 14 after this data link has been coupled.

In order to provide suitable countermeasures in the event of a rupture of one or multiple pneumatic lines 6, 8, 10 (control pressure line, brake pressure line) such as for example an automatic braking operation at least of trailer 14 by an emergency braking device (not shown here), a device for monitoring the pressure in coupleable pneumatic lines 6, 8 and 10 may be provided which monitors for example the pressures prevailing there on the basis of a plausibility test.

Figure 2:
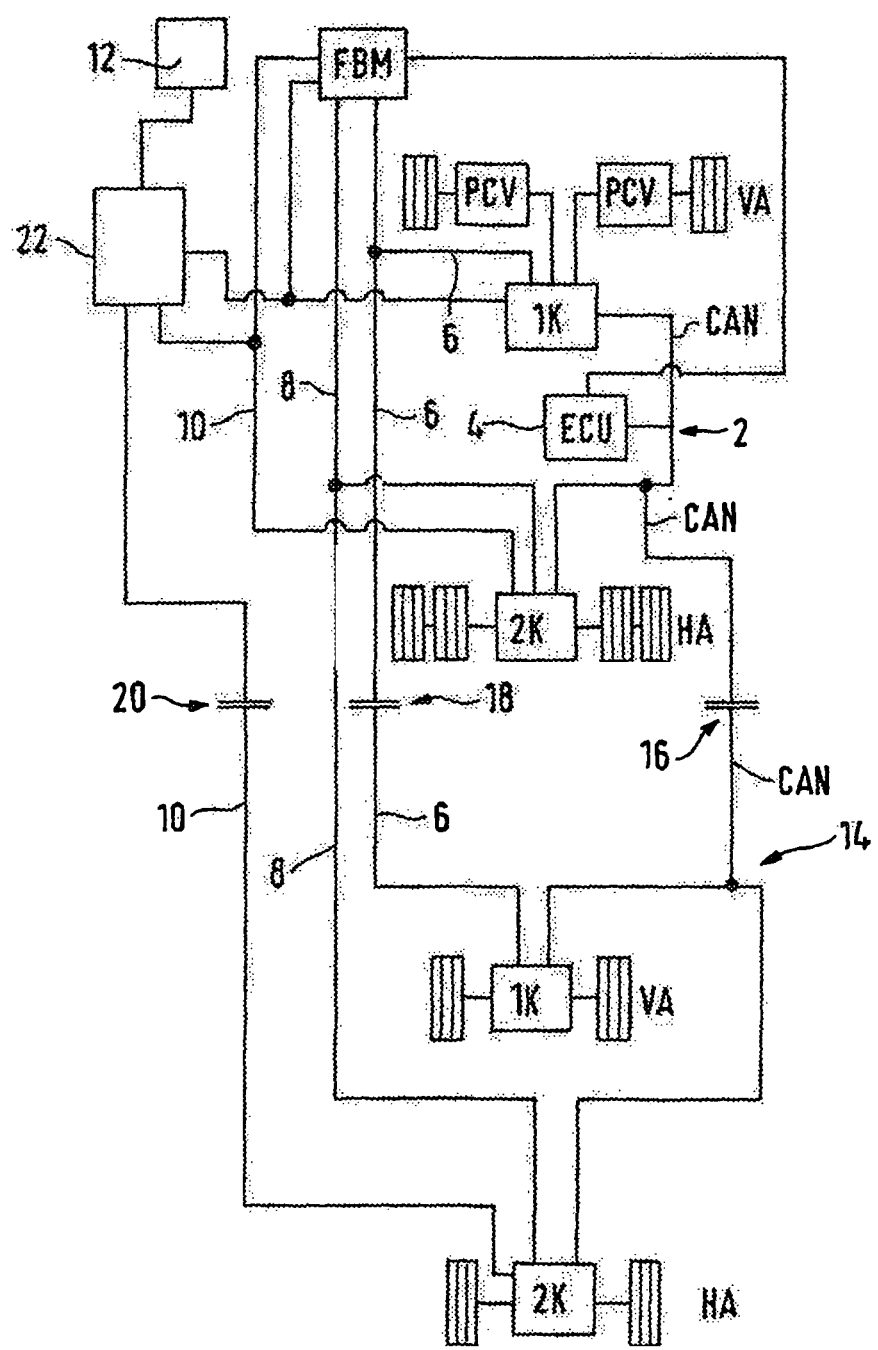
FIG. 2 shows a schematic representation of the structure of an electronically controlled braking device of a towing vehicle-trailer combination according to another exemplary embodiment of the present invention.

In the second exemplary embodiment of the present invention shown in FIG. 2, the parts that are the same and act the same as in the preceding embodiment are denoted by the same reference symbols. In contrast to the preceding embodiment, trailer 14 is a drawbar trailer, in which the brake pressures in the brake cylinders of the front axle VA are generated by a 1-channel pressure control module 1K for an axle-specific antilock control and the brake pressures in the brake cylinders of rear axle HA are generated by a 2-channel pressure control module 2K for a wheel-specific antilock control.

The brake equipment of towing vehicle 2 corresponds to that of the preceding exemplary embodiment with the exception that now both control pressure lines proceeding from foot brake module FBM—6 for the front axle channel and 8 for the rear axle channel—run via the "control pressure" coupling head and from there are fed through into pressure control modules 1K, 2K of trailer 14. For this purpose, control pressure line 6 associated with front axle VA of towing vehicle 2 may be connected to 1-channel pressure control module 1K of front axle VA of trailer 14 and control pressure line 8 associated with rear axle HA of towing vehicle 2 may be connected to 2-channel pressure control module 2K of rear axle HA of trailer 14.

Figure 3:
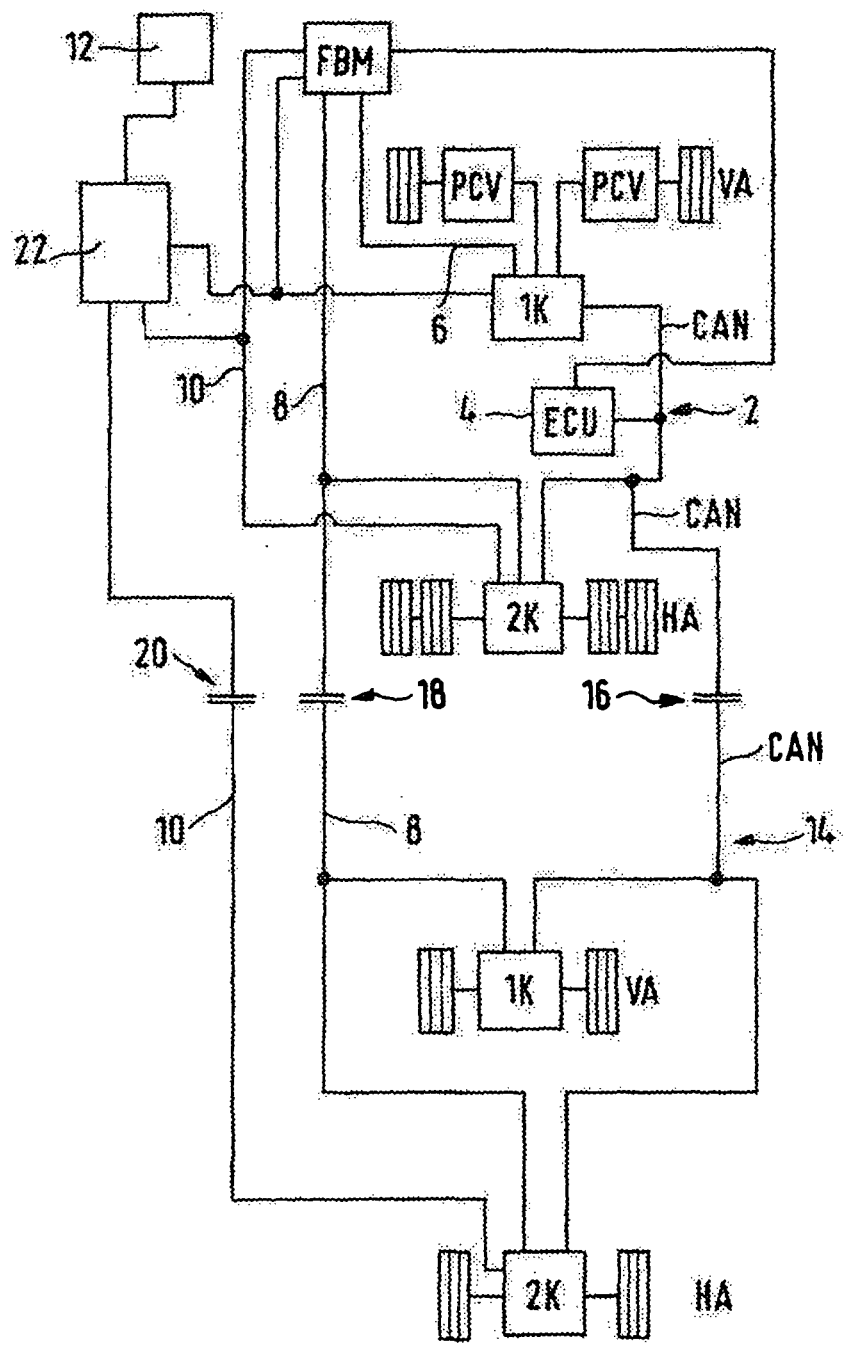
FIG. 3 shows a schematic representation of the structure of an electronically controlled braking device of a towing vehicle-trailer combination according to another exemplary embodiment of the present invention.

In the third exemplary embodiment of the present invention shown in FIG. 3, the parts that are the same and act the same as in the preceding embodiment are denoted by the same reference symbols. In contrast to the preceding embodiment, trailer 14 is connected at coupling "control pressure" 18 to towing vehicle 2 only via a single control pressure line 8, which in towing vehicle 2 supplies for example rear axle HA and in trailer 14 supplies both front axle VA as well as rear axle HA with backup control pressure. This eliminates control pressure line 6 from towing vehicle 2 to trailer 14, which in towing vehicle 2 for example supplies pressure control module 1K of front axle VA with backup control pressure.

The present invention is not limited to the exemplary embodiments described here, but rather may be used in any towing vehicle-trailer combination equipped with an electronically controlled braking device, in particular the number of pressure control modules associated with towing vehicle 2 and trailer 14 and the number of the respectively controllable channels or axles of the towing vehicle and/or of the trailer being irrelevant.

A LIST OF REFERENCE NUMERALS IS AS FOLLOWS

1 Braking device;
2 Towing vehicle;
4 Towing vehicle brake control unit;
6 Control pressure line;
8 Control pressure line;
10 Brake pressure line;
12 Compressed air reservoir;
14 Trailer;
16 Plug-in coupling;
18 "Control pressure" coupling;
"Brake pressure" coupling; and
22 Four-circuit protective valve.

What is claimed is:
1. An electronically controlled braking device of a towing vehicle-trailer combination, comprising:
    a generating arrangement to generate at least one brake request signal;
    an electronic towing vehicle brake control unit associated with the towing vehicle for generating brake pressure setpoint value signals for at least one electro-pneumatic pressure control module of the towing vehicle as a function of the brake request signal;
    a data link between the towing vehicle and the trailer;
    at least one electro-pneumatic pressure control module associated with the trailer for controlling a trailer brake pressure; and
    a braking value sensor to generate the at least one brake request signal as a function of a driver command;
    wherein the data link is for direct communication between the towing vehicle brake control unit and the at least one electro-pneumatic pressure control module of the trailer, and
    wherein the towing vehicle brake control unit and the data link are for directly inputting control signals into the at least one electro-pneumatic pressure control module of the trailer for generating the trailer brake pressure at least as a function of the brake request signal, so that no electronic trailer vehicle brake control unit is needed since the control signals are directly input from the electronic towing vehicle brake control unit into the at least one pressure control module of the trailer.

2. The electronically controlled braking device of claim 1, wherein the braking value sensor (FBM) generates at least one pneumatic and at least one electrical brake request signal.

3. The electronically controlled braking device of claim 2, wherein the at least one pneumatic brake request signal is directly input into the at least one pressure control module of the trailer via at least one coupleable pneumatic control pressure line between the towing vehicle and the trailer.

4. The electronically controlled braking device of claim 3, further comprising:
    a device for monitoring the pressure in at least one of the coupleable pneumatic lines.

5. The electronically controlled braking device of claim 4, wherein the towing vehicle brake control unit detects a coupling of the data link and, following the coupling of the data link, directly inputs control signals into the at least one pressure control module of the trailer.

6. The electronically controlled braking device of claim 4, wherein a data link between the towing vehicle and the trailer is coupleable.

7. The electronically controlled braking device of claim 2, wherein a brake pressure from a compressed air reservoir of the towing vehicle is directly input into the at least one pressure control module of the trailer via at least one coupleable brake pressure line between the towing vehicle and the trailer.

8. The electronically controlled braking device of claim 7, wherein the towing vehicle brake control unit detects a coupling of the data link and, following the coupling of the data link, directly inputs control signals into the at least one pressure control module of the trailer.

9. The electronically controlled braking device of claim 7, wherein a data link between the towing vehicle and the trailer is coupleable.

10. The electronically controlled braking device of claim 1, wherein the towing vehicle brake control unit and the data link for directly inputting control signals into the at least one pressure control module of the trailer are used to generate the trailer brake pressure in dependence on regulating or control functions, which include at least one of a differential slip control, an antilock braking control (ABS), an electronic stability control (ESP), a wear control, and a load-dependent braking force distribution (ALB).

11. The electronically controlled braking device of claim 1, wherein the towing vehicle brake control unit detects a coupling of the data link and, following the coupling of the data link, directly inputs control signals into the at least one pressure control module of the trailer.

12. The electronically controlled braking device of claim 1, wherein a data link between the towing vehicle and the trailer is coupleable.

* * * * *

UNITED STATES PATENT AND TRADEMARK OFFICE
CERTIFICATE OF CORRECTION

PATENT NO. : 8,540,323 B2
APPLICATION NO. : 12/448832
DATED : September 24, 2013
INVENTOR(S) : Broch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Signed and Sealed this
Fifteenth Day of September, 2015

Michelle K. Lee
*Director of the United States Patent and Trademark Office*